United States Patent Office 2,794,032
Patented May 28, 1957

2,794,032
ACYLAMINOANTHRAQUINONES

Wolfgang Frey, Neuewelt, near Basel, and Albin Peter, Binningen, near Basel, Switzerland, assignors, by mesne assignments, to Saul & Co., Newark, N. J., as nominee of Fidelity Union Trust Company No Drawing. Application January 24, 1955, Serial No. 483,826

Claims priority, application Switzerland February 12, 1954

6 Claims. (Cl. 260—377)

The present invention relates to new acylaminoanthraquinones which are useful as dyestuffs for synthetic materials. More particularly, the invention has especial relation to a group of acylaminoanthraquinones which correspond to the formula

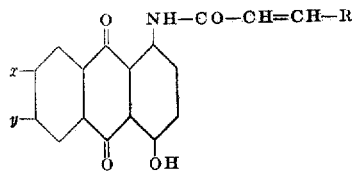

wherein each of $x$ and $y$ stands for hydrogen, fluorine, chlorine or bromine, and R stands for hydrogen, methyl, vinyl, propylene, phenyl, chlorophenyl, carbomethoxy, carbethoxy, carbopropoxy or carbobutoxy.

These acylaminoanthraquinones can be prepared by reacting 1-amino-4-hydroxyanthraquinone or a derivative thereof which is substituted in the 6- and/or 7-positions by fluorine, chlorine and/or bromine, with a functional derivative of an unsaturated acid which corresponds to the formula

HOOC—CH=CH—R wherein R has the aforesaid significance.

As unsaturated acids which contain the carboxylic group in the α-position to the double bond there may be mentioned acrylic acid, crotonic acid, β-vinyl-acrylic, acid, sorbic acid and cinnamic acid, which acids may also be substituted by halogen, and also the mono esters of fumaric and maleic acids with alcohols containing from 1-4 carbon atoms.

Functional derivatives of these acids which can react with 1-amino-4-hydroxyanthraquinone comprise the anhydrides and halogenides. For acylating on a technical scale, the chlorides are particularly suitable.

The reaction is, advantageously, carried out in an organic medium at a temperature between 60° and 150° C.

As organic solvents there can for example be mentioned benzene, toluene, xylene, chlorobenzene, dichlorobenzene, or nitrobenzene. The hydrogen chloride formed by the reaction can be allowed to evaporate off, or can be fixed by the addition of a basic substance to the reaction mixture. Sodium acetate, pyridine, and N-dimethylaminobenzene are particularly suitable for this purpose. By the use of acid-binding agents, the reaction can be carried out at moderate temperatures. A further method of carrying out the process consists in that the acid chloride is formed actually in the acylating mixture. For this purpose the 1-amino-4-hydroxyanthraquinone compound is heated in the chosen solvent with the calculated quantity of the unsaturated acid and there is added thereto the amount of an inorganic acid chloride such as thionyl chloride or phosphorus trichloride necessary for the reaction.

For working up the reaction mixture, the solvent is distilled off directly or with steam; a lower boiling alcohol can also be added thereto. Thereupon the acylaminoanthraquinone which has separated out is filtered off. For use as dyestuffs, the products need to be finely divided. This is carried out in the usual manner by grinding, with dispersing and wetting agents and protective colloids; for helping the grinding process, the materials can be previously reprecipitated from strong sulfuric acid. The pastes obtained by wet grinding can be used as such for dyeing; they can also be dried, however, as for example by atomizing in a warm stream of air.

The new acylaminoanthraquinones dye polyester fibers such as Dacron and Terylene in bright orange to reddish orange shades. The dyeings are characterized by outstanding fastness properties; thus for example they are very fast to washing and to light. Besides serving for the dyeing of objects made from polyesters the new acylaminoanthraquinones also find application for the coloring of dopes and for the printing of textiles.

The following examples illustrate the invention without limiting it. In these examples, the parts denote parts by weight, and the temperatures are given in degrees centigrade.

EXAMPLE 1

12 parts of 1-amino-4-hydroxyanthraquinone are dissolved in 250 parts of chlorobenzene, and the solution is dehydrated by a short distillation. After cooling down to 80°, 9.2 parts of cinnamoylchloride are added within 10 minutes to the solution and this is stirred at 100–130° until a chromatographic test of the mixture shows that no blue-red 1-amino-4-hydroxyanthraquinone is any longer present. The mixture is cooled to 20°, is diluted with 200 parts of methanol, and the separated 1-cinnamoylamino-4-hydroxyanthraquinone which corresponds to the formula

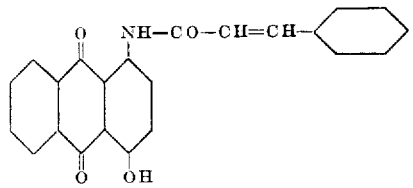

is filtered off. It is washed with methanol and water and dried. The crystalline powder dissolves in concentrated sulfuric acid with a green colour.

5 parts of the crystalline powder thus obtained are dissolved at 20° in 90 parts of concentrated sulfuric acid. The solution is poured in a fine stream into 500 parts of ice-water, the precipitate which is formed is filtered off and washed till neutral. The moist paste is thereupon ground in a stainless ball-mill with 5 parts of the technical condensation product of naphthalenesulfonic acid and formaldehyde. If the paste thus obtained is dried by atomizing, a brick red powder is obtained which is easily dispersed in water. From aqueous suspensions, red-orange shades of good fastness to washing and to light are obtained on fibers of Dacron and Terylene.

EXAMPLE 2

12 parts of well-dried 1-amino-4-hydroxyanthraquinone are dissolved in 300 parts of dry technical xylene mixture at 60–80°. 5 parts of anhydrous pyridine are added to the solution and 11.5 parts of cinnamoyl bromide in 50 parts of xylene mixture are allowed to run into this solution in 30 minutes. The reaction mass is then stirred at the same temperature until the reaction is completed. By the addition of 250 parts of methanol to the reaction mixture, the 1-cinnamoylamino-4-hydroxyanthraquinone is precipitated. It is filtered off, washed with water and dried. The product corresponds in its properties with that described in Example 1.

EXAMPLE 3

12 parts of 1-amino-4-hydroxyanthraquinone are dissolved in 300 parts of chlorobenzene, and the solution thus formed is dehydrated by means of a short distillation. It is then cooled to 75°. 9 parts of the mono-n-propylester of maleic acid and, in the course of 1 hour, 6 parts of phosphorus trichloride are added thereto. The reaction mixture is heated at 100–110° until the chromatogram of a sample shows that the blue-red 1-amino-4-hydroxyanthraquinone is no longer present. The mixture is poured into water, the emulsion which is formed is neutralized with some sodium carbonate, and the chlorobenzene is distilled off with steam. The residual suspension is filtered off after cooling and the filter-cake is dried. The resultant product has the composition

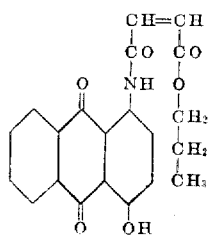

and dissolves in sulfuric acid with an orange coloration. By reason of its good solubility in acetone it can be used for coloring in the spinning process of acetate artificial silk. When brought into a state of fine division, the dyestuff dyes fibers of polyesters in orange shades of good fastness properties.

EXAMPLE 4

12 parts of 1-amino-4-hydroxyanthraquinone and 4.8 parts of crotonic acid are dissolved in 300 parts of toluene. After drying the solution this is brought to a temperature of 75° and 6.6 parts of thionyl chloride are added at this temperature during 30 minutes. The material is then stirred at 100° until the zone of 1-amino-4-hydroxyanthraquinone is no longer found in a test chromatogram. The reaction mass is cooled, 200 parts of methyl alcohol are added thereto, and the red-orange 1-crotonylamino-4-hydroxyanthraquinone which corresponds to the formula

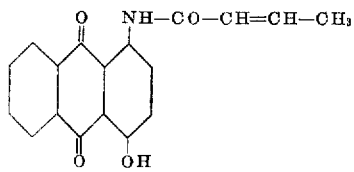

separates out. It is filtered off at 20°, washed with methanol and dried. The dyestuff dissolves in sulfuric acid with a red coloration. In the finely divided state it dyes fibers of polyesters in beautiful orange shades of very good fastness properties.

1-amino-4-hydroxyanthraquinone can be reacted with other acid halides of unsaturated acids as defined herein in the same manner as described in Examples 1–4. In the following Table 1 the acylaminoanthraquinones thus obtained are characterized by their corresponding unsaturated acids and by the coloration of their solutions in sulfuric acid.

Table 1

| Example No. | Unsaturated Acids | Color of the solution in sulfuric acid |
|---|---|---|
| 5 | acrylic acid | orange. |
| 6 | sorbic acid | green. |
| 7 | o-chlorocinnamic acid | Do. |
| 8 | p-chlorocinnamic acid | Do. |
| 9 | monoethylester of fumaric acid | red-orange. |
| 10 | monomethylester of fumaric acid | Do. |
| 11 | mono-n-propylester of fumaric acid | Do. |
| 12 | mono-n-butylester of fumaric acid | Do. |
| 13 | mono-isobutylester of fumaric acid | Do. |
| 14 | β-vinylacrylic acid | green. |
| 15 | monoethylester of maleic acid | orange. |
| 16 | mono-n-butylester of maleic acid | Do. |
| 17 | mono-isobutylester of maleic acid | Do. |
| 18 | mono-isopropylester of maleic acid | Do. |

Table 2 shows acylaminoanthraquinones, likewise characterized by the coloration of the solutions in sulfuric acid, which are obtained by the reaction of 1-amino-4-hydroxyanthraquinones which contain fluorine, chlorine and/or bromine in the 6 and/or 7 positions with functional derivatives of unsaturated acids.

Table 2

| Example No. | 1-amino-4-hydroxy-anthraquinones | Unsaturated acids | Color of the solution in sulfuric acid |
|---|---|---|---|
| 19 | 1-amino-4-hydroxy-6-fluoroanthraquinone. | mono-n-propylester of maleic acid. | orange. |
| 20 | 1-amino-4-hydroxy-6-bromoanthraquinone. | mono-n-propylester of maleic acid. | Do. |
| 21 | 1-amino-4-hydroxy-7-chloroanthraquinone. | sorbic acid | green. |
| 22 | 1-amino-4-hydroxy-6,7-dichloroanthraquinone. | acrylic acid | orange. |
| 23 | 1-amino-4-hydroxy-6-chloro-7-bromoanthraquinone. | acrylic acid | Do. |

It is stated that the 1-amino-4-hydroxyanthraquinones, converted with functional derivatives of the maleic acid half-esters, yield dyeings on polyester fiber materials which have somewhat poorer light fastness than that of dyeings with the corresponding fumaric acid derivatives.

The following are formulae of representative products of the foregoing examples.

EXAMPLE 5

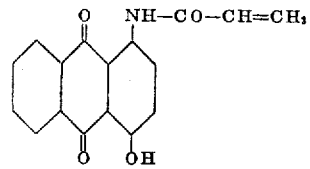

EXAMPLE 11

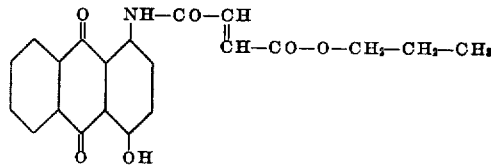

EXAMPLE 13

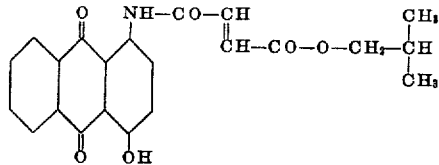

EXAMPLE 17

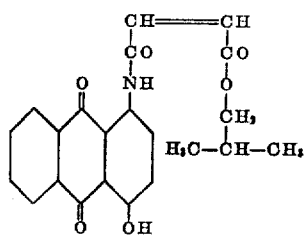

EXAMPLE 24

2 parts of the dyestuff according to Example 11 are dispersed in 20 parts of a swelling agent, as for example an aqueous emulsion of chlorobenzene in 3000 parts of water at 60°. 100 parts of previously wetted Terylene fabric are introduced into this suspension. The bath is warmed to the boiling point in 20 minutes and the dyeing of the fabric is completed at this temperature in the course of one and a half hours. The orange-colored fabric is rinsed with warm and cold water.

EXAMPLE 25

2 parts of the dyestuff according to Example 6 are dispersed in an autoclave in 1500 parts of water. 100 parts of previously wetted Dacron fabric are added to the suspension and the autoclave is closed. It is then warmed up to 100° in the course of 15 minutes and the dyeing is continued for 20 minutes at this temperature and finally for 45 minutes at 125–130°. After cooling the autoclave down to 60°, the beautifully red-orange colored material is taken out and rinsed.

Having thus disclosed the invention what is claimed is:

1. An acylaminoanthraquinone which corresponds to the formula

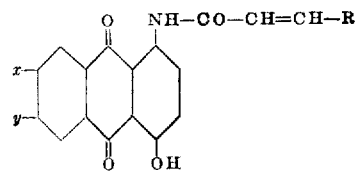

wherein each of $x$ and $y$ stands for an atom selected from the group consisting of hydrogen, fluorine, chlorine and bromine, and R stands for a member selected from the group consisting of hydrogen, methyl, vinyl, propylene, phenyl, chlorophenyl, carbomethoxy, carbethoxy, carboproxy and carbobutoxy.

2. The acylaminoanthraquinone which corresponds to the formula

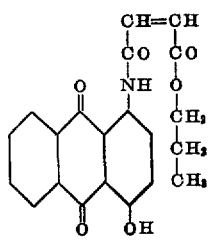

3. The acylaminoanthraquinone which corresponds to the formula

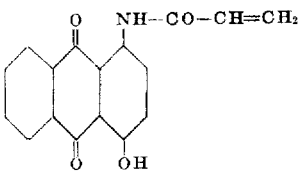

4. The acylaminoanthraquinone which corresponds to the formula

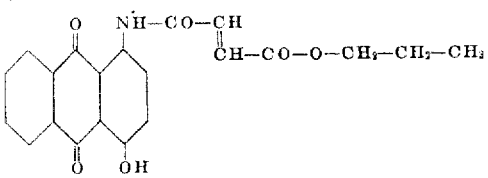

5. The acylaminoanthraquinone which corresponds to the formula

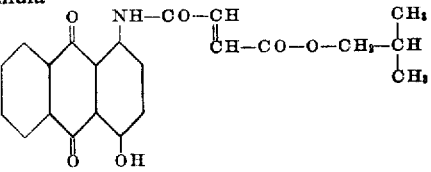

6. The acylaminoanthraquinone which corresponds to the formula

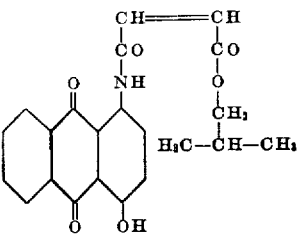

References Cited in the file of this patent
UNITED STATES PATENTS

| | | |
|---|---|---|
| 957,041 | Deinet | May 3, 1910 |
| 2,155,673 | Miller | Apr. 25, 1939 |
| 2,392,663 | Grossman | Jan. 8, 1946 |

UNITED STATES PATENT OFFICE

CERTIFICATE OF CORRECTION

Patent No. 2,794,032　　　　　　　　　　　　　　　　May 28, 1957

Wolfgang Frey et al.

It is hereby certified that error appears in the printed specification of the above numbered patent requiring correction and that the said Letters Patent should read as corrected below.

Column 5, lines 32 and 33, for "carboproxy" read -- carbopropoxy --.

Signed and sealed this 20th day of August 1957.

(SEAL)
Attest:

KARL H. AXLINE

Attesting Officer

ROBERT C. WATSON
Commissioner of Patents